April 7, 1925.  1,532,133

F. GAWRONSKI

STRAINER FOR COOKING VESSELS

Filed Feb. 18, 1924

INVENTOR
Frank Gawronski
BY
ATTORNEY

Patented Apr. 7, 1925.

1,532,133

UNITED STATES PATENT OFFICE.

FRANK GAWRONSKI, OF CHICAGO, ILLINOIS.

STRAINER FOR COOKING VESSELS.

Application filed February 13, 1924. Serial No. 693,439.

*To all whom it may concern:*

Be it known that FRANK GAWRONSKI, a citizen of Poland, residing at Chicago, in the county of Cook and State of Illinois, has invented certain new and useful Improvements in Strainers for Cooking Vessels, of which the following is a specification.

This invention relates generally to a strainer top for cooking vessels or other receptacles, the invention having for an object the provision of a novel device of this sort arranged for application to vessels of different diameters, a further specific object relating to the provision of a novel means for removably securing the top in place on the vessel.

For further comprehension of the invention, and of the objects and advantages thereof, reference will be had to the following description and accompanying drawing, and to the appended claims in which the various novel features of the invention are more particularly set forth.

Fig. 1 of the drawing is a side view of a vessel having my improved strainer top applied thereto.

Figure 1:
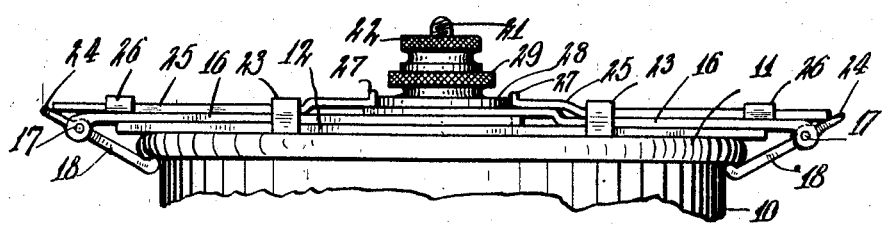
Figure 2:
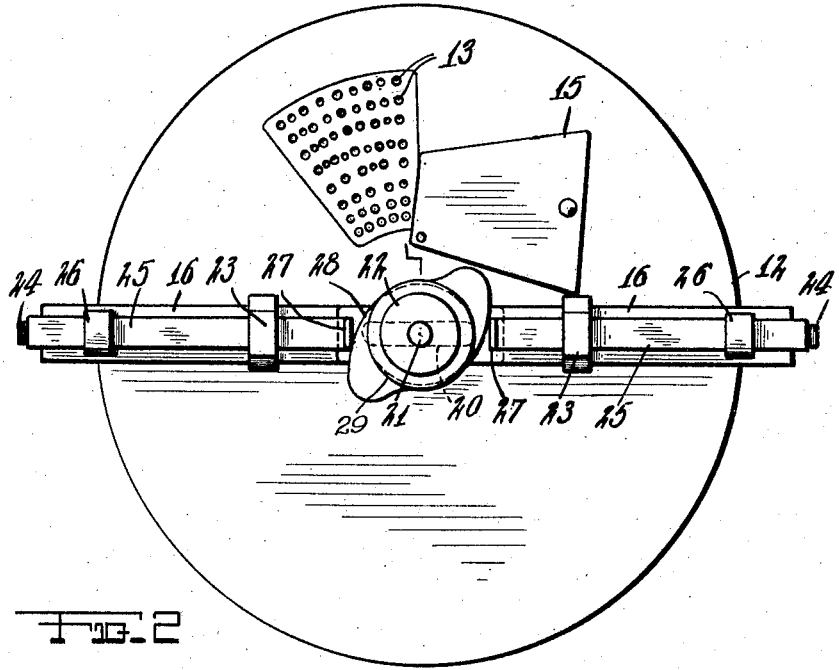
Fig. 2 is a plan view thereof.
Figure 3:
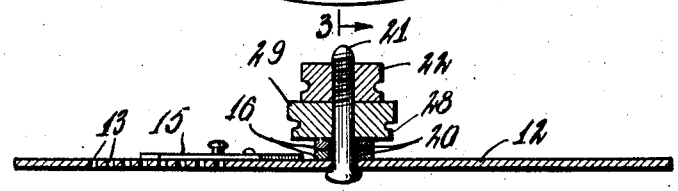
Fig. 3 is a partial vertical sectional view of the top, this view being taken on the line 3—3 of Fig. 2.

In Fig. 1 of the drawing the reference numeral 10 indicates a cooking vessel such as a pot, and which has an ordinary beading 11 running around the top thereof, this beading being utilized in holding my improved top on the vessel. The improved top comprises a circular disk 12 of appropriate size, and which is provided with a strainer portion 13 formed by a number of small apertures grouped together. This strainer portion may be covered by a lid 15 pivoted to the top to swing laterally upon the latter.

To secure the disk 12 on the vessel a pair of diametically extending flat bars 16 are mounted on the disk and overlap one another at adjacent ends, the remote ends of these bars projecting beyond the edges of the disk. Hinged as at 17 to the outer ends of these bars are the arms 18 which constitute jaws adapted to grip the underside of the bead 11 as will be presently set forth. The overlapping ends of the two bars are formed with longitudinal slots 20 through which a stud 21, fixed at its lower end in the disk 12 passes freely, the upper end of this stud being screw threaded as shown, and having a nut 22 threaded thereon to clamp the bars in longitudinally adjusted positions on the disk. The bars 16 are held against lateral displacement in part by the stud 21 and in part by straps 23 fixed to the disk 12.

To swing the jaws 18 against the bead 11, the said jaws are formed with extensions or tailpieces 24 which project upwardly from their hinge ends and are adapted to be engaged by the ends of thrust bars 25 slidable on the bars 16, these bars 25 being guided at their inner ends by the straps 23 before mentioned, and at their other ends by other straps 26 fixed to the bars 16. The inner ends of these thrust bars 25 are upturned as at 27 and are adapted to be engaged by a cam disk 28 freely surrounding the stud 21 above the bars 16 and beneath the nut 22, this cam disk having knurled flange extension 29 by means of which it may be grasped for adjustment purposes.

As will be readily apparent from the above description my improved strainer top can be readily secured upon vessels of different diameters, the slots 20 in the bars 16 permitting of the latter being adjusted to vary the distance between the remote ends thereof to which the jaws 18 are hinged. In attaching my improved top to a vessel, the nut 22 being first loosened, the top is placed on the vessel and the cam 28 swung to move the thrust bars 25 outward to engage the tail-pieces 24 and bring the jaws 18 upward under the bead 11, after which the nut is tightened, binding the cam 28 and the bars 16 in their adjusted positions.

While I have illustrated and described my preferred embodiment of my invention it will be understood that I do not limit myself to the exact details of construction herein shown, and that various changes and modifications might be made therein without departing from the spirit and scope of the invention as defined in the appended claims.

It will also be apparent that the strainer portion found in the top 12 permits of regulation of the escape of steam from the vessel.

Having thus described my invention what I claim as new and desire to protect by Letters Patent of the United States is as follows:

1. A device of the class described comprising a disk, and adjustable means thereon for gripping a vessel, including a pair of bars slidably mounted on said disk and having overlapping adjacent ends formed with longitudinal slots, and means for clamping said ends to the said disk.

2. A device of the class described comprising a disk, and adjustable means thereon for gripping a vessel, including a pair of bars slidably mounted on said disk and having overlapping adjacent ends formed with longitudinal slots, and means for clamping said ends to the said disk, comprising a threaded stud fixed to the disk and passing through the said slots, and a nut threaded on said stud.

3. A device of the class described comprising an apertured disk, a pair of bars slidable along said side disk and having overlapping adjacent ends formed with longitudinal slots, a stud fixed to said disk and passing through said slots, jaw elements hinged to the remote ends of said bars and adapted to be swung to engage a vessel, thrust bars slidable along the first mentioned bars for operating said jaws, an operating cam for said jaws, and a common device for locking said cam in operative position and clamping said first named bars to the disk.

4. A device of the class described comprising an apertured disk, a pair of bars slidable along said side disk and having overlapping adjacent ends formed with longitudinal slots, a stud fixed to said disk and passing through said slots, jaw elements hinged to the remote ends of said bars and adapted to be swung to engage a vessel, thrust bars slidable along the first mentioned bars for operating said jaws, an operating cam for said jaws, and a common device for locking said cam in operative position and clamping said first named bars to the disk, said operating cam comprising a disk freely surrounding the said stud, and said common device comprising a nut threaded on said stud and adapted to bear on said cam disk.

In testimony whereof I have affixed my signature.

FRANK GAWRONSKI.